United States Patent [19]
Uehara et al.

[11] Patent Number: 5,822,493
[45] Date of Patent: Oct. 13, 1998

[54] REAL-TIME IMAGE RECORDING/PRODUCING METHOD AND APPARATUS AND VIDEO LIBRARY SYSTEM

[75] Inventors: Hirotoshi Uehara, Hirakata; Takanari Kadowaki, Sanda; Shuuhei Taniguchi, Moriguchi; Norio Aoki, Hirakata, all of Japan

[73] Assignee: Matsushita Electric Industrial Co., Ltd., Kadoma, Japan

[21] Appl. No.: 559,434

[22] Filed: Nov. 15, 1995

[30] Foreign Application Priority Data

Nov. 17, 1994 [JP] Japan .................................. 6-283408

[51] Int. Cl.⁶ .............................. H04N 5/917; H04N 5/91
[52] U.S. Cl. .............................................. 386/109; 386/46
[58] Field of Search ...................... 358/335, 342, 358/312, 311, 310; 360/32, 33.1, 13, 10.3; 348/384; 386/83, 46, 109, 111, 112, 27, 73, 734; H04N 5/917, 5/91

[56] References Cited

U.S. PATENT DOCUMENTS

| | | |
|---|---|---|
| 4,899,229 | 2/1990 | Hashimoto . |
| 4,942,476 | 7/1990 | Koga et al. ............................. 358/335 |
| 5,140,437 | 8/1992 | Yonemitsu et al. ...................... 386/82 |
| 5,204,748 | 4/1993 | Lagoni . |
| 5,239,382 | 8/1993 | Hatakenaka et al. ..................... 366/46 |
| 5,253,054 | 10/1993 | Fujiwara et al. . |
| 5,329,320 | 7/1994 | Yifrach . |
| 5,398,074 | 3/1995 | Duffield et al. . |
| 5,517,321 | 5/1996 | Yoshida ................................... 358/335 |
| 5,541,738 | 7/1996 | Mankovitz ............................... 388/83 |
| 5,555,463 | 9/1996 | Staron . |

FOREIGN PATENT DOCUMENTS

| | | |
|---|---|---|
| 0545727A2 | 6/1993 | European Pat. Off. . |
| 0553910A1 | 8/1993 | European Pat. Off. . |
| 0558306A2 | 9/1993 | European Pat. Off. . |
| 0570818A2 | 11/1993 | European Pat. Off. . |
| 0594241A1 | 4/1994 | European Pat. Off. . |
| 0621729A1 | 10/1994 | European Pat. Off. . |
| 0675644A2 | 10/1995 | European Pat. Off. . |
| 2700908 | 7/1994 | France . |
| 5765076 | 4/1982 | Japan . |
| 05347735 | 12/1993 | Japan . |
| 614274 | 1/1994 | Japan . |
| 6178258 | 6/1994 | Japan . |
| 7-30851 | 1/1995 | Japan . |
| 2222742 | 3/1990 | United Kingdom . |
| 2259824 | 3/1993 | United Kingdom . |

OTHER PUBLICATIONS

EP Search Report for Appln. No. 95118054.6–dated Oct. 27, 1997.

*Primary Examiner*—Robert Chevalier
*Attorney, Agent, or Firm*—Renner, Otto, Boisselle & Sklar, P.L.L.

[57] ABSTRACT

A real-time image recording/reproducing apparatus which receives an image signal and compresses the image signal so as to produce compressed data which the apparatus stores. The apparatus judges whether or not sufficient empty space for storing the compressed data exists. The apparatus stores the compressed data if sufficient empty space exists, or allocates required empty space by releasing oldest data among the stored compressed data if sufficient empty space does not exist. The apparatus receives a replay instruction and expands the compressed data in response to the replay instruction so as to produce image data, and outputs the image data.

16 Claims, 18 Drawing Sheets

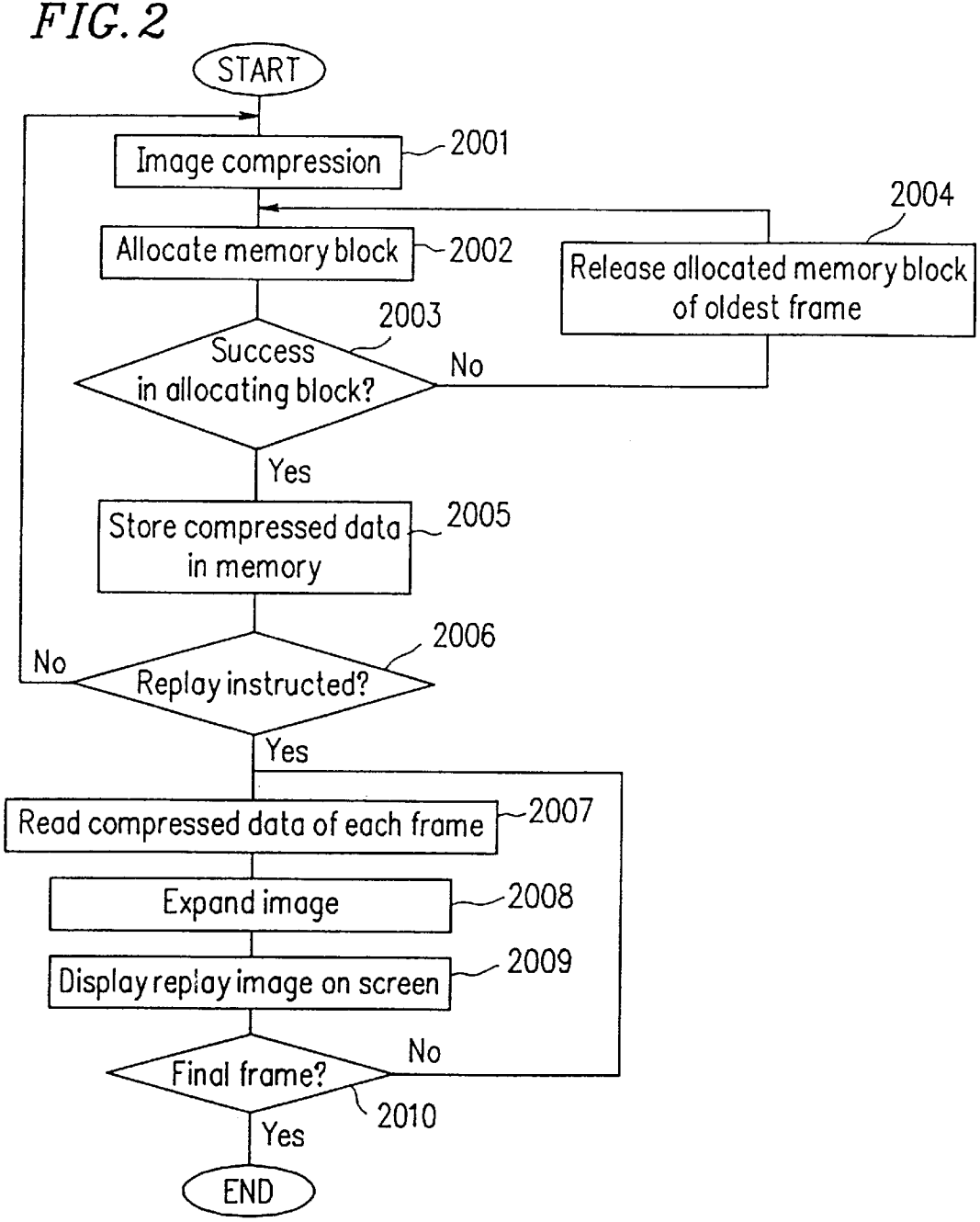

Compressed data management table

| Frame No. | Start block | End block |
|---|---|---|
| 0 | 0 | 2 |
| 1 | 3 | 6 |
| 2 | -1 | -1 |
| 3 | -1 | -1 |
| 4 | -1 | -1 |
| . | -1 | -1 |
| . | -1 | -1 |
| . | -1 | -1 |
| . | -1 | -1 |
| . | -1 | -1 |
| m | -1 | -1 | old_fm=0
current_fm=1

Compressed data management table

| Frame No. | Start block | End block |
|---|---|---|
| 0 | -1 | -1 |
| 1 | 3 | 6 |
| 2 | 7 | 9 |
| 3 | . | . |
| 4 | . | . |
| . | . | . |
| . | . | . |
| . | . | . |
| . | . | . |
| . | . | . |
| m' | n | 0 | old_fm=0
current_fm=m

LPF

| n | Tap coefficient |
|---|---|
| 0 | −1/8 |
| 1 | 2/8 |
| 2 | 6/8 |
| 3 | 2/8 |
| 4 | −1/8 |

HPF

| n | Tap coefficient |
|---|---|
| 0 | 1/2 |
| 1 | −2/2 |
| 2 | 1/2 |

FIG. 7A

| Fixed size |
|---|
| freq 1 |
| freq 2 |
| freq 3 |
| freq 4 |
| freq 5 |
| freq 6 |
| freq 7 |
| freq 8 |
| freq 9 |
| freq 10 |

FIG. 7B

| freq 1 |
|---|
| freq 2 |
| freq 3 |
| freq 4 |
| freq 5 |
| freq 6 |

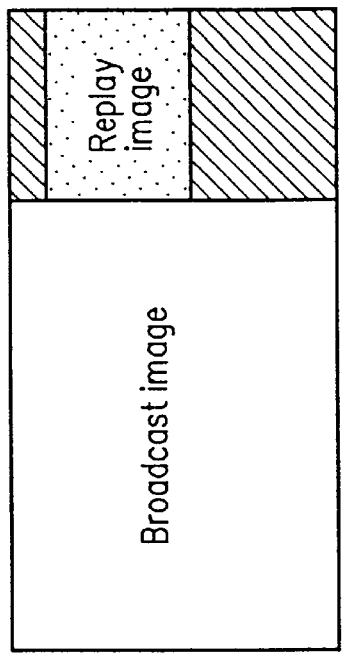
*FIG. 8C* 16:9 screen
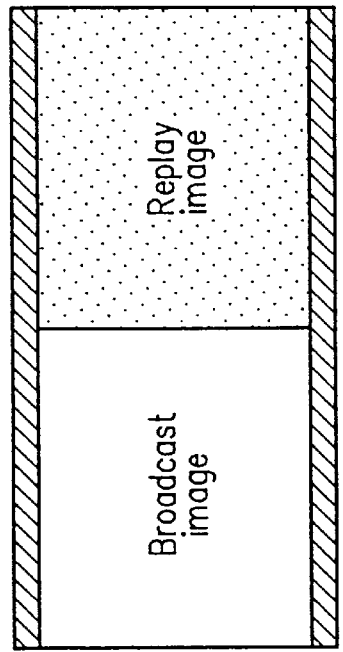
*FIG. 8D* 16:9 screen
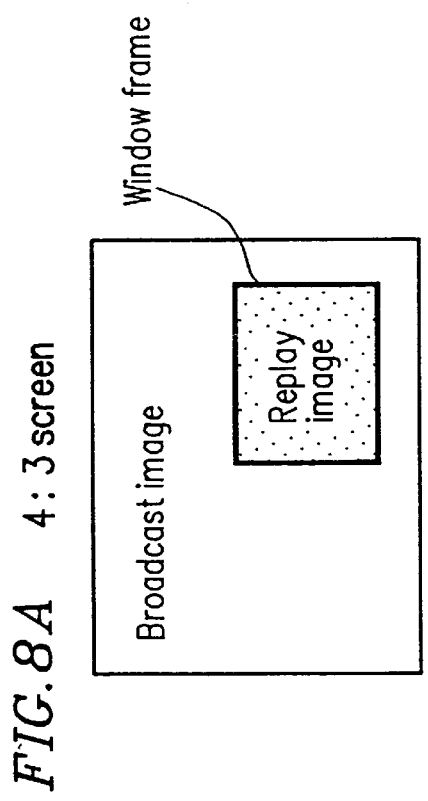
*FIG. 8A* 4:3 screen
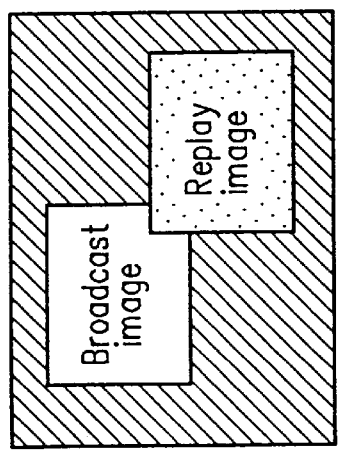
*FIG. 8B* 4:3 screen

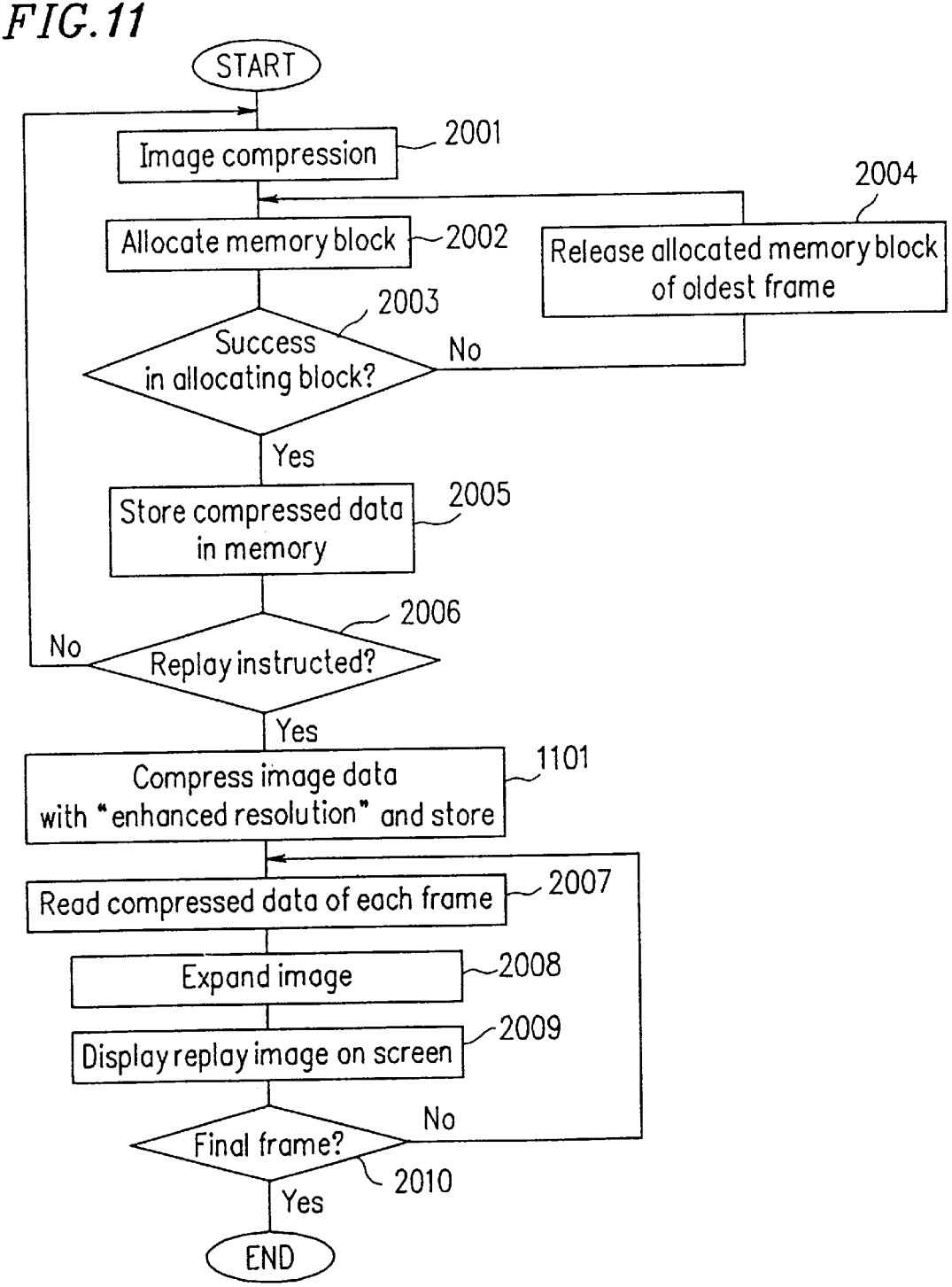

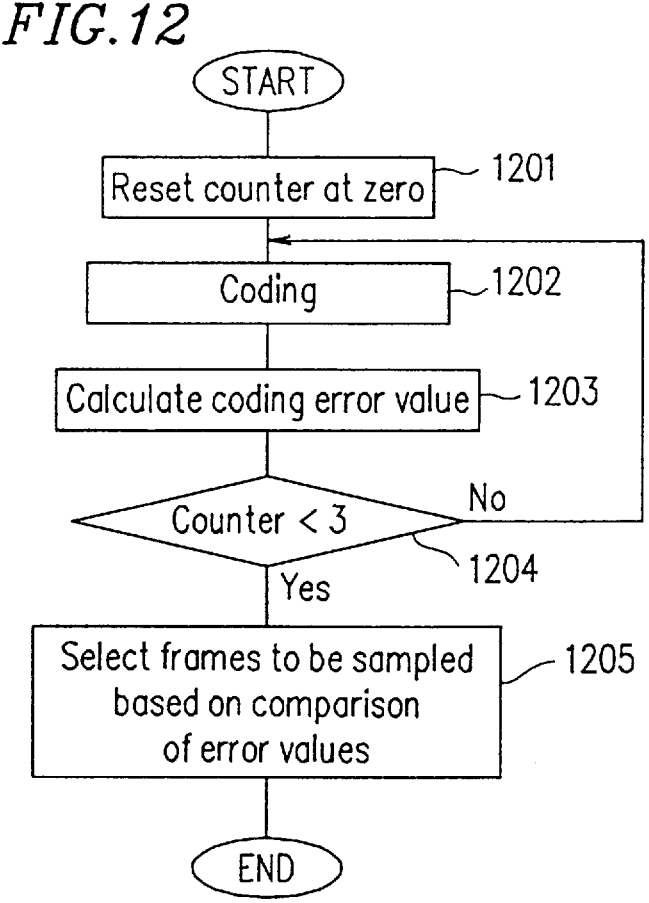

Fixed sampling

Optimal sampling (Error value / data amount are minimum)

FIG. 17A

| Tape identification information | Compressed data memory position information |
|---|---|

FIG. 17B

| Tape identification information | Tape position information | Compressed data memory position information |
|---|---|---|

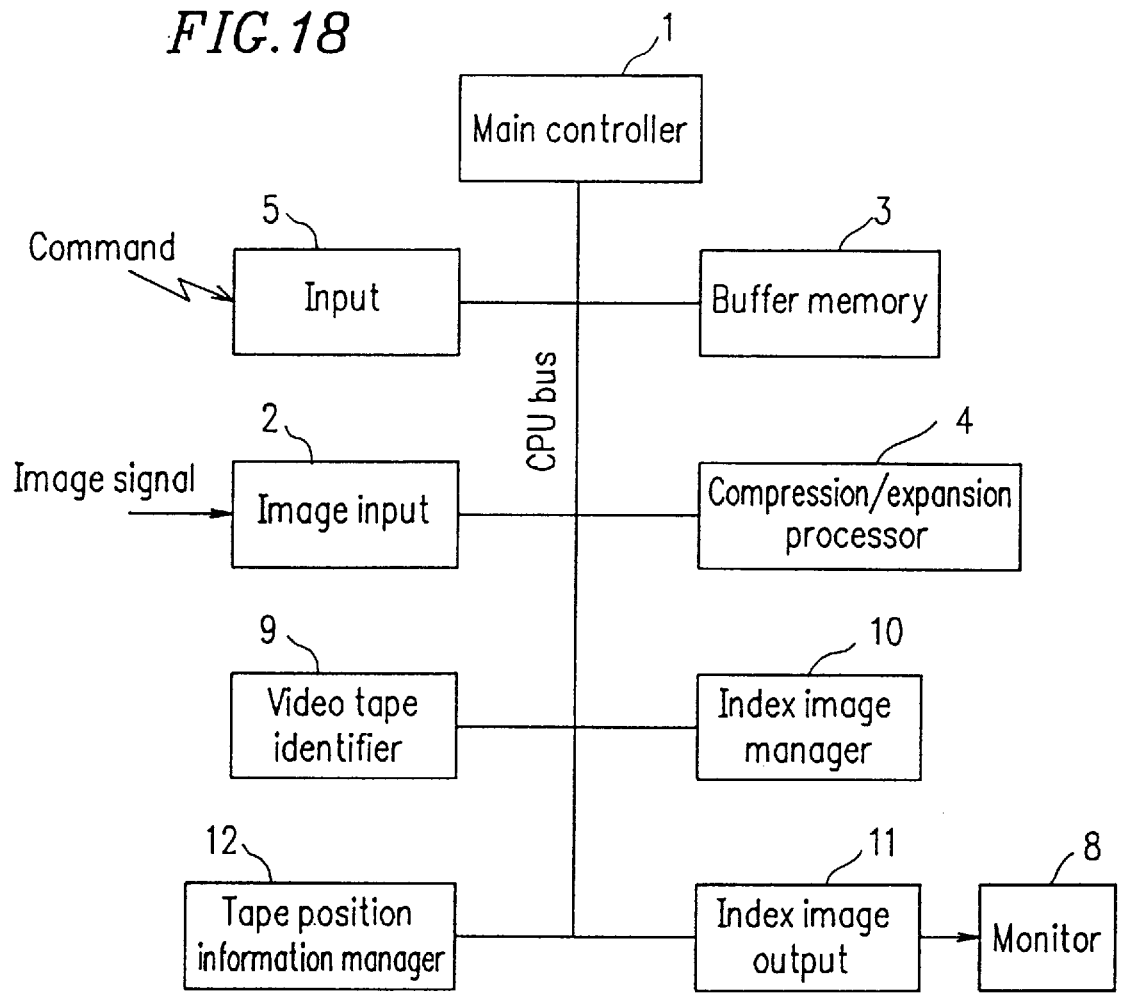

REAL-TIME IMAGE RECORDING/ PRODUCING METHOD AND APPARATUS AND VIDEO LIBRARY SYSTEM

BACKGROUND OF THE INVENTION

1. Field of the Invention

The present invention relates to a real-time image recording/reproducing method for a TV receiver, a video tape recorder (VTR), a computer system having a function of receiving TV broadcasting, and the like, where broadcast images of several seconds are sequentially stored so as to allow the user to replay at any time a scene which he or she desires to view again or a scene which he or she has missed, and an apparatus for realizing the same.

The present invention also relates to a video library system which produces index images from recorded images and displays the index images on a screen as a list for the purpose of confirmation of the contents of a recorded video tape for a VTR.

2. Description of the Related Art

With recent progress in broadcasting technology, an exciting scene (generally lasting several seconds) obtained at a live sportscast, for example, is repeatedly replayed. However, individual viewers have their own preferences on scenes they desire to view again. It is not possible to satisfy all viewers only by such broadcast replay scenes. Viewers' individual requests will be satisfied if the viewers themselves can reproduce a broadcast scene using their TV receivers.

The concept of providing a TV receiver with a replay function is known. For example, Japanese Laid-Open Patent Publication No. 57-65076 describes an apparatus having this function. The apparatus includes a means for recording a set of receiving image signals corresponding to a plurality of scenes in a memory at predetermined time intervals and a means for sequentially reproducing the stored image signals as a plurality of still pictures upon receipt of a viewer's instruction. As a result, the viewer is able to reproduce a missed scene instantaneously. These prior art documents, however, do not describe specific means for realizing the apparatus sufficiently, and therefore, together with the problem of high cost, the apparatus has not been put into practical use.

Existing TV receivers can not realize the replay function. Some TV receivers can store a still picture (corresponding to one frame) by using a circuit called "picture in picture" which can display two images on a screen simultaneously, but there are no known TV receivers which can store and reproduce a moving image (lasting at least several seconds).

Images can easily be recorded using a VTR. However, in the case of tape recording, instantaneous reproduction is not obtained because it is not possible to randomly access the tape media and a waiting time is required for the winding of the tape. This is a problem of the tape media. The replay function will probably be used even when the user desires to reproduce an exciting scene at a sportscast instantaneously, for example. Thus, any time lag at the operation undesirable and disadvantageous. Further, in order to record images at any time, an endless tape or the like is required. This raises another problem as to the durability of the tape.

In order to obtain instantaneous response capability, a random-accessible memory such as a semiconductor memory is desirable. However, huge amount of memory capacity is required if image data is stored in the semiconductor memory without any processing. Normally, therefore, images are compressed to reduce the data amount. Due to recent developments in semiconductor technology, image compression can be accomplished at less cost, and thus this technique is now available for home appliances.

When images are compressed in order to be stored in a memory, however, the following problems arise:

(1) In image compression, variable-length coding using Huffman codes and the like are generally used. In this case, the data amount after the compression is not fixed. Accordingly, when such variable-length data is stored in a memory by way of real-time repeated overwriting, a memory management mechanism corresponding to the variable-length data is indispensable.

(2) In the case where a predetermined amount of compressed data is stored without overwriting, region management within the memory is further complicated. This management becomes necessary when an additional function of keeping a favorite replayed scene or keeping a scene showing an address for a quiz program as a still picture, for example, is realized.

On the other hand, with regard to the management of a recorded video tape, users have strongly requested that a function be available for confirming the contents of recorded images on a video tape instantaneously. Currently, in order to confirm the contents of the recorded video tape, the user must send the tape forward from the beginning and reproduce scenes. This is too inefficient. As one approach to solve this problem, a system is provided where the title of a program recorded is input by the user and the title is managed in association with the video tape to indicate where the program has been recorded (indexed video tape). In this system, the index information is stored in the heading portion of the video tape or in a memory of a VTR, so that the information can be displayed at the insertion of the video tape into the VTR.

In the above system, however, the user must input the index information. Accordingly, this system has not been fully utilized because of the nuisance of inputting the information. It will be convenient, therefore, if information corresponding to the index can be automatically produced.

SUMMARY OF THE INVENTION

The real-time image recording/reproducing apparatus of this invention, includes: image input means for receiving an image signal; compression means for compressing the image signal so as to produce compressed data; storing means for storing the compressed data; control means for judging whether or not a sufficient empty space required for storing the compressed data exists in the storing means, and storing the compressed data in the storing means if a sufficient empty space exists, or allocating a required empty space by releasing oldest data among the compressed data stored in the storing means and storing the compressed data in the allocated empty space if a sufficient empty space does not exist; instruction input means for receiving a replay instruction; expansion means for expanding the compressed data stored in the storing means in response to the replay instruction input from the instruction input means so as to produce image data; and output means for outputting the image data.

Alternatively, the real-time image recording/reproducing apparatus of this example includes: image input means for receiving an image signal; compression means for compressing the image signal so as to produce compressed data; storing means for storing the compressed data, including a plurality of blocks having the same size connected with each other in a ring manner; control means for judging whether or not a sufficient number of empty blocks required for storing the compressed data exist in the storing means, and storing the compressed data in the storing means if a sufficient number of empty blocks exist, or allocating a required number of empty blocks by releasing oldest data among the compressed data stored in the storing means and storing the compressed data in the allocated empty blocks if a sufficient number of empty blocks does not exist; instruction input means for receiving a replay instruction; expansion means for expanding the compressed data stored in the storing means in response to the replay instruction input from the instruction input means so as to produce image data; and output means for outputting the image data.

In one embodiment, the compression means transforms the image signal into a plurality of coefficient data representing different frequency bands such as sub-band coding, quantizing each of the frequency bands, and variable-length coding the quantized coefficient data, and the compression means further comprises rate control means for deleting the variable-length coded data in the order of higher frequency components to lower frequency components so as to limit the amount of the compressed data to be equal to or less than a predetermined value.

In another embodiment, the apparatus further includes image synthesization means for synthesizing the image data output from the output means and the image signals input from the image input means, to be displayed together, wherein the brightness level of the image signals is lower than the brightness level of the image data.

In still another embodiment, the control means halts the storing of the compressed data in the storing means in response to the replay instruction, and restarts the storing of the compressed data in the storing means automatically in the case where the duration from the input of the replay instruction until the input of next replay instruction exceeds a predetermined time.

In still another embodiment, the compression means compresses at least one field or frame of image data so as to have higher image quality in response to the replay instruction.

In still another embodiment, the compression means calculates a compression error value for each field or frame, selects one compressed data at a predetermined field or frame interval based on the compression error value.

In still another embodiment, the compression means calculates a size of data after compression for each field or frame, selects one compressed data at a predetermined field or frame interval based on the size of data after compression.

According to another aspect of the present invention, there is provided a real-time image recording/reproducing method for an apparatus including storing means for storing data. The method includes the steps of: a) inputting a image signal; b) compressing the image signal so as to produce compressed data; c) judging whether or not a sufficient empty space required for storing the compressed data exists in the storing means, and storing the compressed data in the storing means if a sufficient empty space exists, or allocating a required empty space by releasing oldest data among the compressed data stored in the storing means and storing the compressed data in the allocated empty space if a sufficient empty space does not exist; d) inputting replay instruction; e) expanding the compressed data stored in the storing means in response to the replay instruction so as to produce image data; and f) outputting the image data.

Alternatively, the real-time image recording/reproducing method for an apparatus including storing means for storing data, the storing means including a plurality of blocks having the same size connected with each other in a ring manner, includes the steps of: a) inputting a image signal; b) compressing the image signal so as to produce compressed data; c) judging whether or not a sufficient number of empty blocks required for storing the compressed data exist in the storing means, and storing the compressed data in the storing means if a sufficient number of empty blocks exist, or allocating a required number of empty blocks by releasing oldest data among the compressed data stored in the storing means and storing the compressed data in the allocated empty blocks if a sufficient number of empty blocks does not exist; d) inputting replay instruction; e) expanding the compressed data stored in the storing means in response to the replay instruction so as to produce image data; and f) outputting the image data.

In one embodiment, the step b) includes the steps of: transforming the image signal into a plurality of coefficient data representing different frequency bands; quantizing each of the frequency bands; variable-length coding the quantized coefficient data, and deleting the variable-length coded data in the order of higher frequency components to lower frequency components so as to limit the amount of the compressed data to be equal to or less than a predetermined value.

In another embodiment, the method further includes the step of synthesizing the image data and the image signal to be displayed together, wherein the brightness level of the image signal is lower than the brightness level of the image data.

In still another embodiment, the step c) includes the steps of: halting the storing of the compressed data in the storing means in response to the replay instruction, and re-starting the storing of the compressed data in the storing means automatically in the case where the duration from the input of the replay instruction until the input of next replay instruction exceeds a predetermined time.

In still another embodiment, in the step b) at least one field or frame of image data is compressed so as to have higher image quality in response to the replay instruction.

In still another embodiment, the step b) includes the steps of: calculating a compression error value for each field or frame; selecting one compressed data at a predetermined field or frame interval based on the compression error value.

In still another embodiment, the step b) includes the steps of: calculating a size of data after compression for each field or frame; selecting one compressed data at a predetermined field or frame interval based on the size of data after compression; and decimating information on the selected field or frame along the time axis.

According to still another aspect of the present invention, there is provided an image library system having a member in which a recording medium is inserted, including: identification means for outputting identification information identifying the recording medium inserted in the member; image input means for receiving an image signal; compression means for compressing the image signal at a predetermined interval so as to produce a plurality of compressed data; storing means for storing the plurality of compressed data; association means for associating the identification information of the recording medium with each of the plurality of compressed data stored in the storing means; instruction input means for receiving replay instruction; expansion means for expanding each of the plurality of compressed data associated with the recording medium in response to the replay instruction input from the instruction input means, so as to produce a plurality of image data; and display means for displaying the plurality of image data as a list.

In one embodiment, the predetermined interval is determined based on a relative position of the recording medium to a recording start position.

In another embodiment, the predetermined interval is determined based on an absolute position of the recording medium.

In still another embodiment, the storing means and the association means are disposed in the recording medium.

Thus, according to the present invention, a TV receiver and a VTR can be implemented having a novel function where broadcast images can be replayed at any time and a favorite scene among replayed scenes can be kept like a memo. Further, according to the present invention, the above replay function can be realized by software on a computer, and a home computer system having the above function can be implemented.

According to the video library system of the present invention, the contents of the video tape can be confirmed instantaneously by displaying index images produced from recorded images automatically. Thus, a system which does not require inputting index information by the user can be implemented.

Thus, the invention described herein makes possible the advantages of (1) providing a real-time image recording/reproducing method in which variable-length compressed data are stored in small blocks of memory under region management and are replayed upon receipt of user's instruction, (2) providing a real-time image recording/reproducing apparatus for realizing the above method, and (3) providing a video library system where recording images are automatically sampled at predetermined intervals, compressed, and stored in a memory and the like together with identification information of a video tape, and index images corresponding to the video tape are read from the memory at library searching so as to be displayed on a screen as a list.

These and other advantages of the present invention will become apparent to those skilled in the art upon reading and understanding the following detailed description with reference to the accompanying figures.

BRIEF DESCRIPTION OF THE DRAWINGS

FIG. 2 is a flowchart representing a real-time image recording/reproducing method according to the present invention.

FIGS. 7A and 7B show the status of fixed-length buffers when compressed data is stored in accordance with the flowchart of FIG. 6.

FIGS. 8A to 8D show examples of display screens in Example 1 shown in FIG. 1.

FIG. 11 is a flowchart representing the operation of a main controller in Example 5, where image data after replay instruction is stored with high quality.

FIG. 12 is a flowchart of the frame selection in Example 6, where frames to be sampled are selected based on the compression error value.

FIGS. 17A and 17B show management tables in an index image controller in Example 8.

FIG. 18 shows a configuration of the video library system of Example 9.

DESCRIPTION OF THE PREFERRED EMBODIMENTS

EXAMPLE 1

A first example of the present invention will be described with reference to FIGS. 1 to 5.

Figure 1:
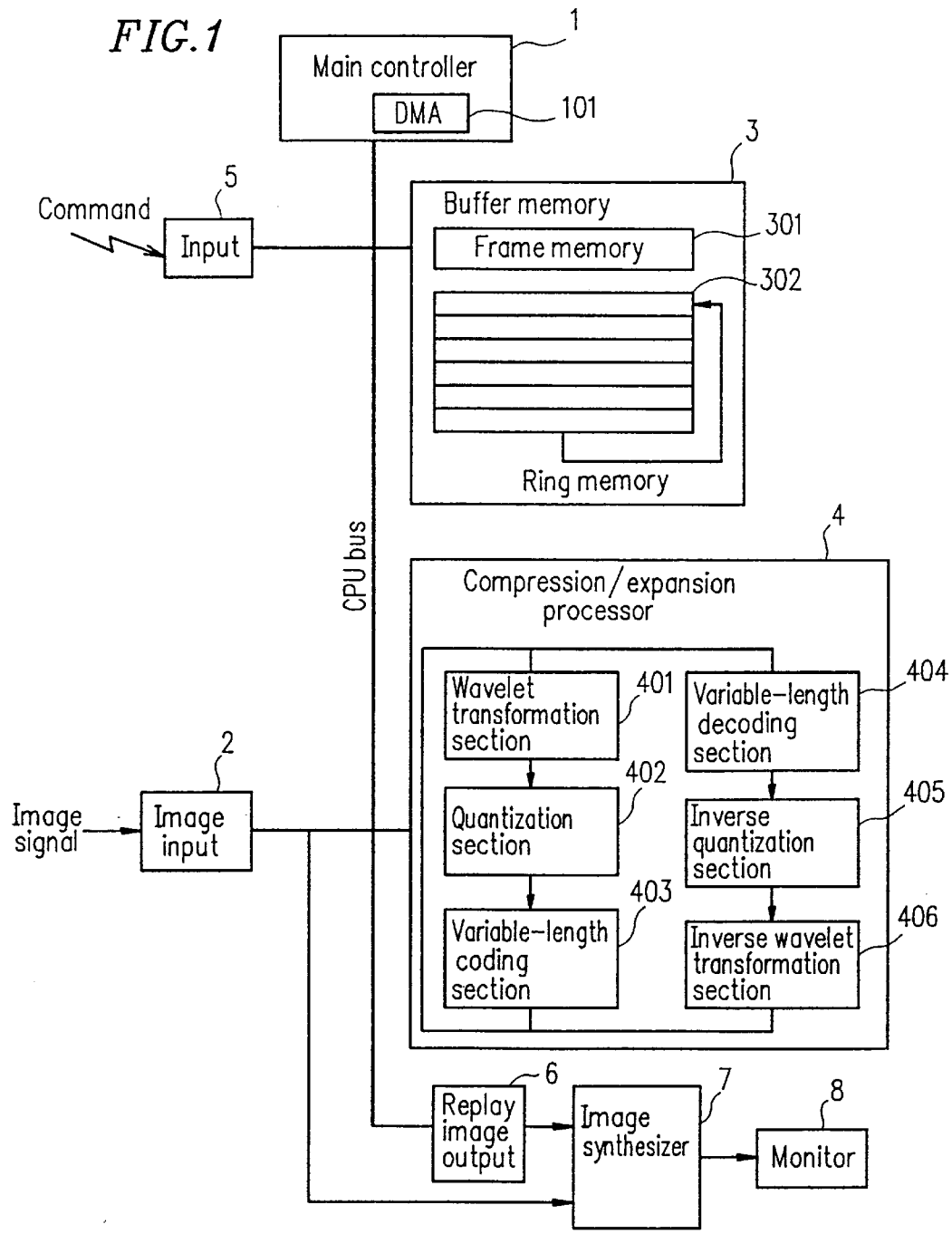
FIG. 1 is a block diagram showing a configuration of the real-time image recording/reproducing apparatus of Example 1 according to the present invention.

FIG. 1 is a block diagram showing a configuration of the real-time image recording/reproducing apparatus of Example 1 according to the present invention. FIG. 2 is a flowchart showing the operation of the apparatus. In actual applications, the components shown in FIG. 1 are incorporated in a TV receiver, a VTR, and the like to effect functions thereof.

Referring to FIG. 1, a main controller 1 controls the entire apparatus. In Example 1, the main controller 1 is described as having therein a DMA (direct memory access) controller 101 for controlling data transfer between blocks as will be described later. The apparatus also includes an image input 2 which digitizes image signals per frame line, for example, and a buffer memory 3 which stores image data from the image input 2 and compressed data. The buffer memory 3 is composed of DRAM, for example. The apparatus further includes a compression/expansion processor 4 which compresses/expands the image data and an input 5 which receives commands from the user. The input 5 is composed of an infrared remote controller and a receiver thereof, for example. A replay image output 6 converts expanded image data into analog signals and outputs the converted analog signals. The replay image output 6 is mainly composed of a line memory for storing display data for one frame line and a read circuit therefor, for example. An image synthesizer 7 synthesizes the input image and the replay image and outputs the synthesized result to a monitor 8. The image synthesizer 7 has a function of displaying two different images on a screen simultaneously.

Figure 3A:
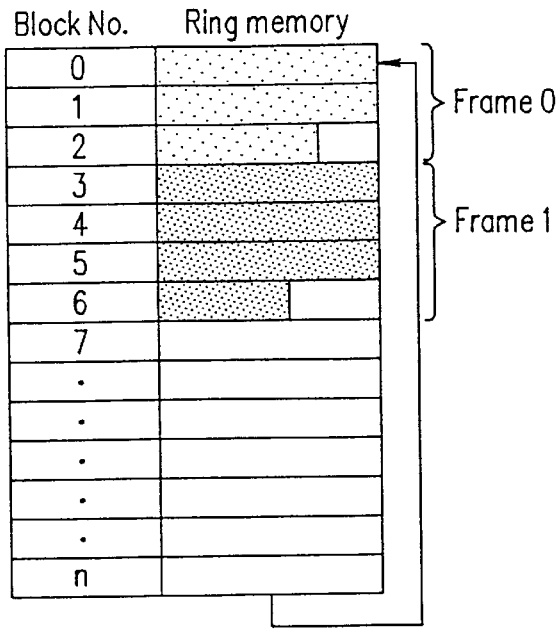
FIGS. 3A and 3B show the region management of memory buffers by a main controller.
Figure 3B:
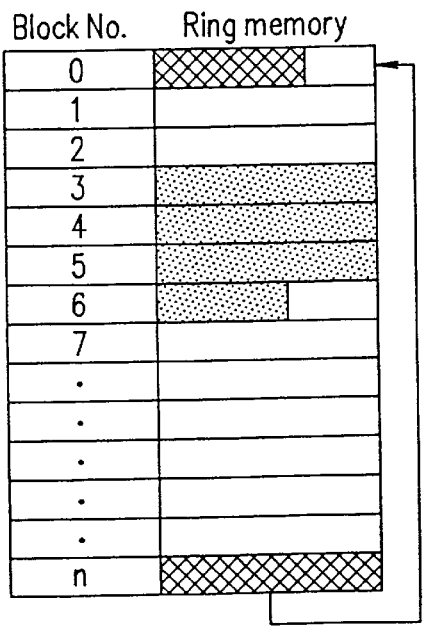

The buffer memory 3 is divided into two parts: a frame memory 301 for storing the input image data or display data;

and a ring memory 302 for storing the compressed data. The main controller 1 controls the ring memory 302 by dividing the memory space into a plurality of blocks having a predetermined size and by connecting the blocks with each other in a ring manner as shown in FIGS. 3A and 3B. The block number of each block indicates an exclusive memory address.

A compressed data management table as shown in FIGS. 3A and 3B is provided, where the frame number of each data corresponds to the block number(s) where the data is actually stored. The value "−1" is used as the initialized value of the block number. In FIGS. 3A and 3B, both the current frame number (current_fm) and the oldest frame number (old_fm) are also controlled. These are used for determining a heading frame for the replay operation.

Hereinbelow, the image replay operation of the apparatus shown in FIG. 1 will be described with reference to the flowchart shown in FIG. 2.

First, when the user turns on a TV receiver, a VTR, or the like to start watching a program, the same image signals as those being displayed on a screen are input through the image input 2.

Step 2001: The DMA 101 of the main controller 1 transfers the image data per line from the image input 2 to the frame memory 301 of the buffer memory 3. Then, the main controller 1 instructs the compression/expansion processor 4 to compress the image data per frame or field. This compression will be described later in detail.

Step 2002: The main controller 1 allocates a required number of empty blocks corresponding to the size of the compressed data so as to store the compressed data in the ring memory 302. The allocation of empty blocks in the ring memory 302 is conducted by using the compressed data management table shown in FIGS. 3A and 3B. Namely, the number of empty blocks required is obtained by calculating the difference between the end block number of the current_fm and the start block number of the old_fm. In FIG. 3A, the end block number of the current_fm is "6" and the start block number of the old_fm is "0". Then, the block numbers 7 to n are empty. In FIG. 3B, the end block number of the current_fm is "0" and the start block number of the old_fm is "3". Then, the block numbers 1 and 2 are empty.

Step 2003: If the allocation of empty blocks is not successful, the process proceeds to step 2004. If successful, the process proceeds to step 2005.

Step 2004: The main controller 1 deletes the oldest frame data region in the management table to allocate an empty space. More specifically, the value of the old_fm is renewed and the management information thereof is initialized. In the example shown in FIG. 3B, the region of frame 0 is deleted when frame m is newly stored. In this case, the start/end block numbers of frame 0 are reset at the initialized value (−1).

Step 2005: The main controller 1 stores the compressed data in the allocated memory block region.

Step 2006: Upon completion of the storing of the compressed data, the main controller 1 checks whether or not the input 5 has received a replay instruction. If it has been received, the process proceeds to the next step 2007. If not, the processings in steps 2001 to 2006 are repeated. This ensures that the latest compressed data is always stored in the ring memory 302.

Step 2007: Upon receipt of the replay instruction, the main controller 1 sequentially reads the stored data in the ring memory 302 starting from the oldest compressed data (old_fm) and outputs the data to the compression/expansion processor 4.

Step 2008: The main controller 1 instructs the compression/expansion processor 4 to expand the compressed data to the original frame or field data, and transfers the expanded data to the frame memory 301 by means of the DMA 101.

Step 2009: The main controller 1 reads the image data in the frame memory 301 per line by means of the DMA 101 and transfers the data to the replay image output 6. The replay image output 6 temporarily stores the data in an internal line memory and reads the data in synchronization with the display so as to output the replay image data to the monitor 8.

Step 2010: The main controller 1 repeatedly performs steps 2007 to 2009 until the reading of the latest compressed data (current_fm) is competed. Upon completion of the reproduction of the final frame, the main controller 1 returns the process to step 2001.

Thus, according to the method of Example 1, it is possible to store all the current compressed data in the ring memory 302 and simultaneously to replay the stored compressed data upon receipt of a replay instruction through the input 5 instantaneously.

In the deletion of blocks at step 2004, a flag bit indicating whether or not data in the block can be deleted may be provided for each block in the compressed data management table. Then, by checking the flag bit at the deletion, a certain memory block region can be kept without renewal while the processing continues. In other words, since the memory region is controlled by the block numbers, the storing operation can be performed by operating the block numbers. This realizes an apparatus where the user can keep a favorite scene or a still picture (memo) undeleted while enjoying the replay of the latest images.

In step 2007, the replay operation is not necessarily started from the oldest compressed data, but it may be started from compressed data stored a predetermined time before the replay instruction. The replay may also be started from the latest compressed data stored in the ring memory 302 to effect reverse reproduction. This can be used in the backward searching for a scene.

In step 2009, the replay image output 6 may control the reading of the image data from the frame memory in synchronization with the image signals from the image input 2, so that two images can be displayed on the screen simultaneously as shown in FIGS. 8A to 8D. This makes it possible to present both the broadcast image and the replay image simultaneously.

Next, referring to FIGS. 4A to 4C, 5A, and 5B, the operation of the compression/expansion processor 4 will be described. In Example 1, wavelet transformation, a type of subband coding, is used as a compression method. Though the compression method is not limited to the wavelet transformation, the latter is adopted in Example 1 because, in the wavelet transformation, the compression can be realized by use of a comparatively small circuit.

The subband coding is a known compression method of image data, where an image signal is divided into a plurality of frequency band components (subbands) by filters before the compression. In the subband coding, image data is first divided into two parts horizontally by a two-division filter (low/high pass filter) to effect ½ down-sampling and obtain a horizontal low frequency component (L coefficient) and a horizontal high frequency component (H coefficient). Then, each of the coefficient data is further divided into two parts vertically by a two-division filter (low/high pass filter) to effect ½ down-sizing and obtain total four components.

Figures 4A, 4B, 4C:
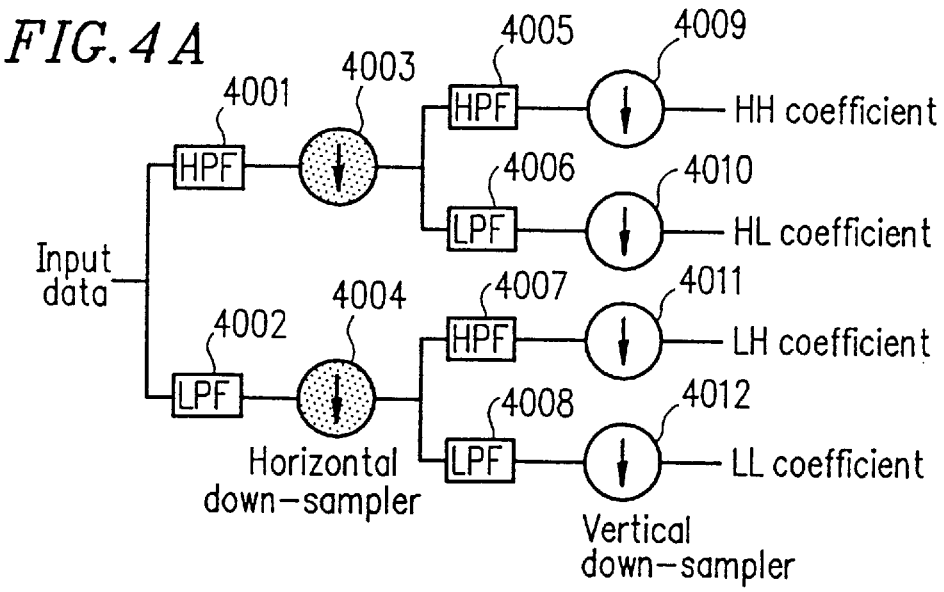
FIGS. 4A, 4B, and 4C show an algorithm of one frequency division by wavelet transformation.

FIG. 4A shows a flow of this operation. The reference numeral 4001 denotes a horizontal high pass filter (HPF) and 4002 a horizontal low pass filter (LPF). The reference numerals 4003 and 4004 denote horizontal down-samplers for effecting horizontal ½ down-sampling, 4005 and 4007 vertical HPFs, 4006 and 4008 vertical LPFS, and 4009 to 4012 vertical down-samplers for effecting vertical ½ down-sampling.

Figure 5A:
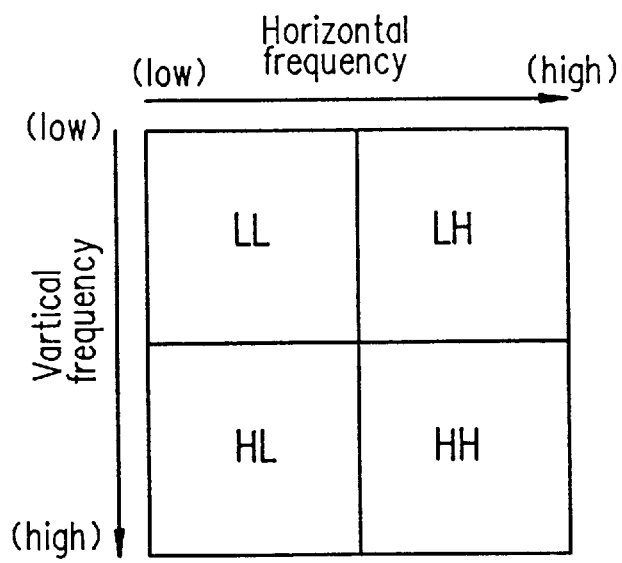
FIGS. 5A and 5B show frequency components divided by the wavelet transformation.
Figure 5B:
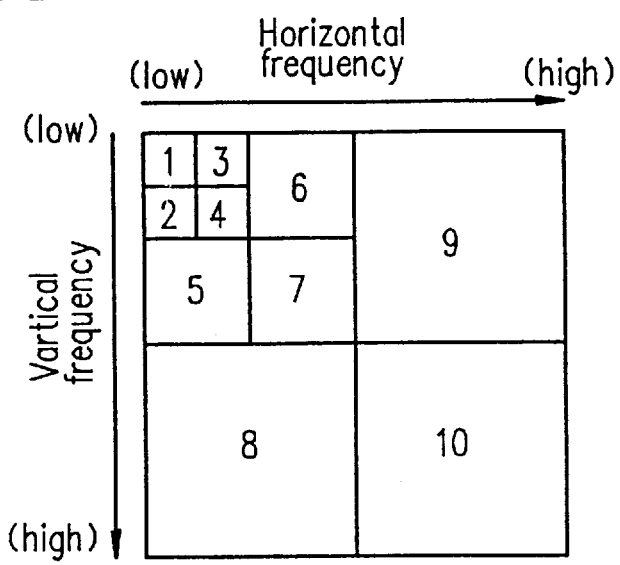

Examples of the band division of an image signal conducted by a method as shown in FIG. 4A are shown in FIGS. 5A and 5B. In FIG. 5A, the signal is divided into two equal parts both horizontally and vertically to obtain total four subbands. The two-letter code of each subband represents the horizontal and vertical frequency levels, low (L) or high (H), in this order.

In the wavelet transformation coding as one of the subband coding, the low frequency band component (component LL in FIG. 5A) is sequentially divided into smaller components, so as to obtain graded subband division. An example of the division by the wavelet transformation is shown in FIG. 5B, where the image data is divided into total 10 subbands having different bandwidths. The numbers given to each subband are the subband numbers.

FIGS. 4B and 4C respectively show filter coefficients of the LPFs 4002, 4006, and 4008 and those of the HPFs 4001, 4005, and 4007. These can be obtained by bit shift operation. Accordingly, a circuit for the wavelet transformation can be small.

A wavelet transformation section 401 of the compression/expansion processor 4 shown in FIG. 1 conducts the transformation as described above. In the compression, each of the thus-divided frequency components is quantized by a quantization section 402 (subtraction), and a variable-length coding section 403 produces coded data.

The expansion is the reverse of the compression. In other words, the coded data is decoded by a variable-length decoding section 404, and the decoded data is returned to the coefficient data by an inverse quantization section 405. The coefficient data is then subjected to a processing inverse of the wavelet transformation as shown in FIG. 4A by an inverse wavelet transformation section 406, so as to expand the data.

The wavelet transformation is considered to provide good subjective image quality, reducing block distortion and mosquito noise, compared with another method, such as DCT (discrete cosine transformation), where the compression is conducted after block division. For example, according to simulation results, a comparatively less degraded image can be obtained by the wavelet transformation even when an image of 320×240 pixels (each eight bits) is compressed to a level of data amount of 10 KB to 15 KB.

The image data amount can also be reduced by frame sampling in the time-axis direction. In this method, if the number of frames per second is excessively reduced, the resultant image is not realistic, lacking the smoothness in the movement. However, the reduction of the number of frames is required in order to reduce the image data amount. In reality, therefore, an appropriate number of frames is selected in the trading-off between the memory capacity and the image quality.

For example, for the compression of 10 frames per second, the data amount per second is 100 to 150 K-bytes. When a DRAM having a capacity of 16 M-bits (2 MB) is used as the buffer memory 3, data of about 10 seconds can be stored in the buffer memory 3. This is sufficient for the replay time since, for example, a scene where a score is made in a baseball or soccer game lasts only several seconds.

When the frame sampling has been conducted, expansion is required according to the frame rate under the control of the main controller 1. For example, when the frame rate is 10 frames/second, the main controller 1 reads compressed data corresponding to one frame from the buffer memory 3 at intervals of "0.1 seconds". The read compressed data is expanded to the original data by means of the compression/expansion processor 4, and the expanded image data is output to the replay image output 6 every "0.1 seconds".

In Example 1, the wavelet transformation is used as the compression method. However, other compression methods including orthogonal transformation coding such as DCT may also be used. The data is compressed per frame or field in Example 1. However, compression combining inter-field differential and inter-frame differential may also be conducted. In the latter case, the compression ratio can be further increased, and the number of frames stored can be increased. Alternatively, the resolution and thus the number of frames per second can be increased while the number of frames stored is not increased.

It is possible to provide the image input 2 with a function of contracting receiving images and the input 5 with a function of selecting the contraction ratio. In such a case, the user can select either a high image quality to obtain replay images with high resolution or a long replay (recording) time of images though the resolution of the images is low.

Further, in the replay reproduction under the control of the main controller 1, a slow-motion reproduction can be obtained if the reproduction is conducted at intervals longer than the actual frame sampling interval. For example, when compressed data of 10 frames/second is expanded every "0.2 seconds" and output to the replay image output 6, ½ slow-motion reproduction is possible. In reverse, when the compressed data is reproduced at intervals shorter than the actual frame sampling interval, fast-forward reproduction is possible.

The reproduction rate may be selected through the input 5, so that the user can select the reproduction rate such as slow-motion and fast-forward sending.

In Example 1, the semiconductor memory is used as the data memory means. Another random-accessible device such as a hard disk device and a magnetooptic disk device may also be used as the memory means. In this case, also, the region management method where the disk is divided into small blocks has the same effect when storing length-variable data repeatedly. A hard disk device may have a relatively high cost, but it has a memory capacity several times as large as that of the semiconductor memory. Accordingly, a longer replay time is realized without the contraction and the frame sampling.

In the flowchart of FIG. 2, when the input 5 receives a replay instruction, the reproduction is started while the storing of the compressed data is halted. However, with a larger memory capacity, it is possible to separate the storing in steps 2001 to 2004 from the reproduction in steps 2006 to 2009, so as to conduct the reproduction of the stored images while keeping the storing continuously. In this case, it is necessary to start the reproduction from a frame corresponding to the replay time, not from the oldest frame. Thus, the broadcast images can be stored in the buffer memory 3 continuously while stored images are being replayed. Using this method, time-shift viewing of broadcast images is possible.

FIGS. 8A to 8D show examples of synthesized images obtained by the image synthesizer 7. In FIG. 8A, the broadcast image is displayed on the entire screen while the replay image is displayed on a portion of the broadcast image (picture-in-picture display). If the size of the replay image allows, the replay image may be displayed on the entire screen while the broadcast image is displayed on a portion of the replay image. A window frame may be formed to clearly distinguish the replay image from the broadcast image. In FIG. 8B, the broadcast image is contracted to reduce the overlapping portion thereof with the replay image so that the two entire images can be viewed simultaneously.

FIGS. 8C and 8D are examples of a 16:9 wide TV screen. Utilizing the wide screen of which horizontal resolution is greater than that of the normal 4:3 TV screen by about 1.5 times, the entire broadcast image and the smaller-size entire replay image can be displayed on the same screen (picture-out-picture display) (FIG. 8C). The user can view the two complete images with no overlapping portions. In FIG. 8D, the two images of the same size are displayed side by side. Utilizing the features of the wide screen, a powerful replay image can be presented.

EXAMPLE 2

In Example 1, the data size compressed by the compression/expansion processor 4 is variable. To store the variable-length compressed data, the buffer memory 3 is divided into small blocks and the blocks are connected with each other in a ring manner. The compressed data is stored in the blocks allocated according to the data amount. In this case, however, the number of frames in a memory is different from the number of frames in another memory even when the two memories have the same capacity. For example, when a 16 M-bit DRAM is used, the replay time lasts for "20 seconds" for the compressed data amount of 10 KB, while it lasts for "13 seconds" for the compressed data amount of 15 KB. This means that the replay time differs depending on the replayed scene from the standpoint of the viewer. This may confuse the viewer.

In Example 2, a means for controlling the compressed data to be equal to or less than a fixed size is added, so that a uniform reproduction time can be obtained.

Figure 6:
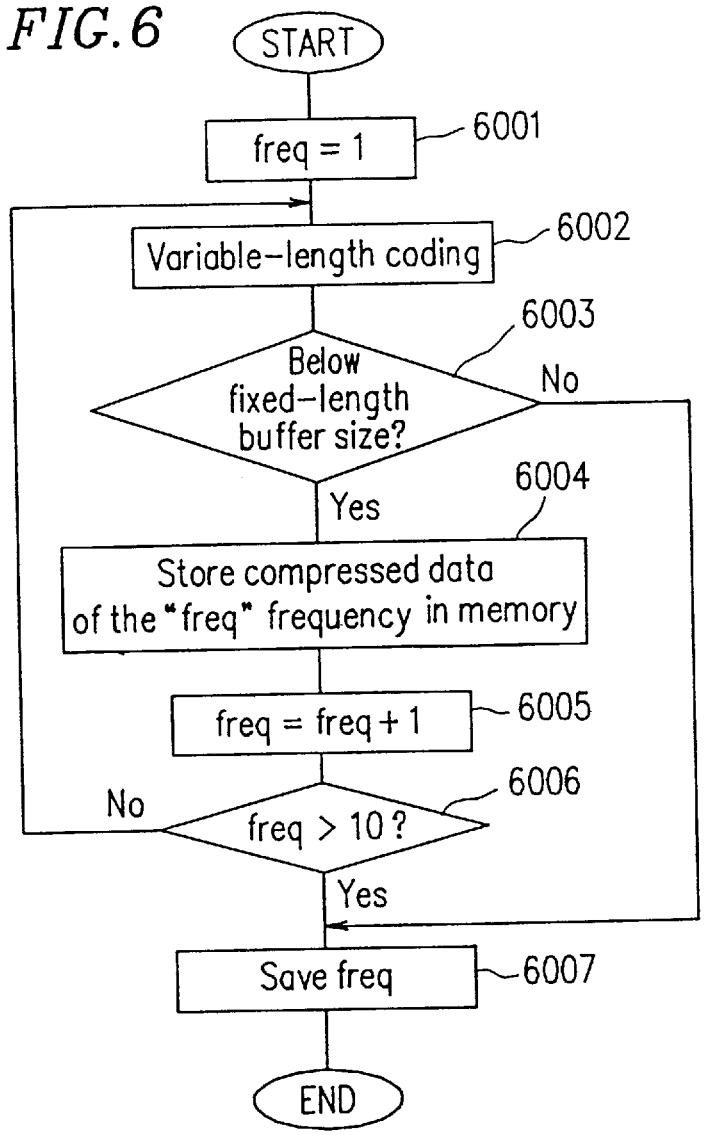
FIG. 6 is a flowchart representing an alternative compression method in Example 2 where a fixed rate control is conducted.

While the basic configuration of Example 2 is the same as that of FIG. 1, the compression by the compression/expansion processor 4, especially the method of variable-length coding, is different from that in Example 1. FIG. 6 is a flowchart of the variable-length coding in this example conducted for each frequency component.

Step 6001: A variable (freq) for identifying the subband number on which the variable-length coding is conducted is set at "1".

Step 6002: Variable-length coded data for the frequency component of a subband number of freq is produced.

Step 6003: It is judged whether or not the produced variable-length coded data can be stored in a fixed-length buffer. If possible, the process proceeds to the next step. If not possible, the process proceeds to step 6007.

Step 6004: The produced variable-length coded data is stored in the buffer.

Step 6005: The subband number freq is incremented by "one".

Step 6006: If the subband number freq exceeds "10", the process proceeds to the next step. If it is equal to or less than "10", the process returns to step 6002.

Step 6007: The subband number freq is saved as the management information.

Figures 7A, 7B:
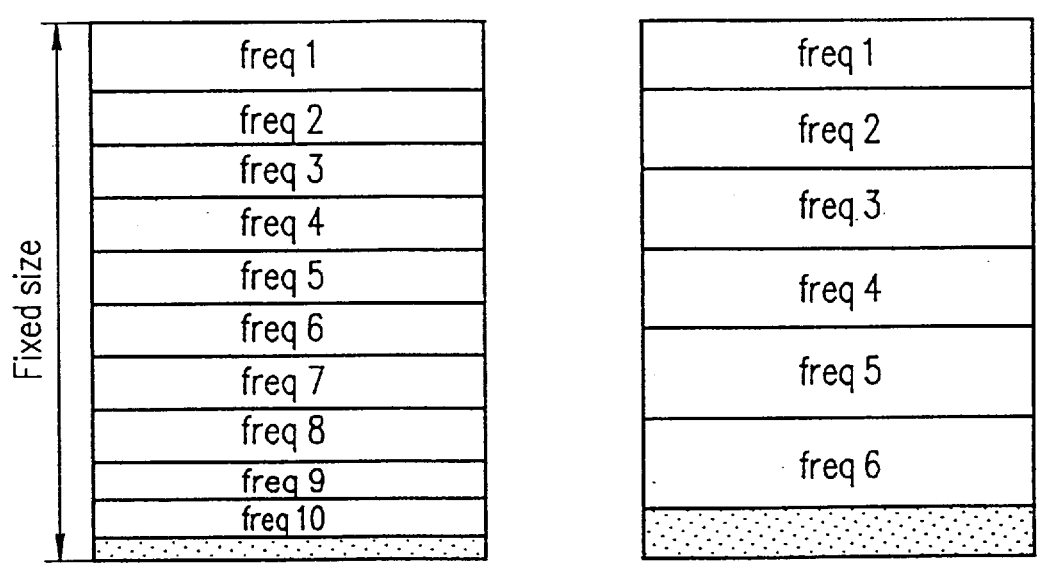

With the above processing, the variable-length data can be stored in the fixed-length buffer. FIGS. 7A and 7B are conceptual views of the fixed-length buffers of the same size. In FIG. 7A, all of 10 subband code data are stored in the buffer. In FIG. 7B, only six subbands upto subband 6 are stored. In the case of FIG. 7B, areas corresponding to the subbands 7 to 10 are filled with "0"s at the expansion of the compressed data. This makes the resultant expanded image a little vague, though not so significantly degraded.

Thus, by conducting graded variable-length coding of the data starting from the lower-frequency component, the fixed rate control can easily be realized while minimizing the degradation of image quality. With this method, the memory management shown in FIGS. 3A and 3B can be simplified. In other words, by associating the block size with the compressed data amount per frame, the data address in the ring memory can be determined exclusively from the frame number.

In Example 2, as the rate control, the higher-frequency components are cut according to the capacity at the variable-length coding. The rate control can also be realized by making parameters of the quantization section 402 variable. In the latter case, it is required to repeat the variable-length coding until the data size becomes equal to or less than the fixed-length size. In this case, however, the 10 band components can always be stored.

EXAMPLE 3

In Example 1, only the image display positions and sizes are controlled at the synthesizing of the broadcast image and the replay image by the image synthesizer 8. When the two images overlap, however, the overlapping images make the viewer feel uncomfortable if they have the same brightness. For this reason, in the superimposing of the movies and the like, the brightness level of the portion of a background image where subtitles are to be superimposed is lowered. Example 3 presents a real-time image recording/reproducing apparatus where the brightness level of an image synthesized can be controlled. While the basic configuration of the apparatus of Example 3 is the same as that shown in FIG. 1, the configuration of the image synthesizer 7 in Example 3 is different from that in Example 1.

Figure 9:
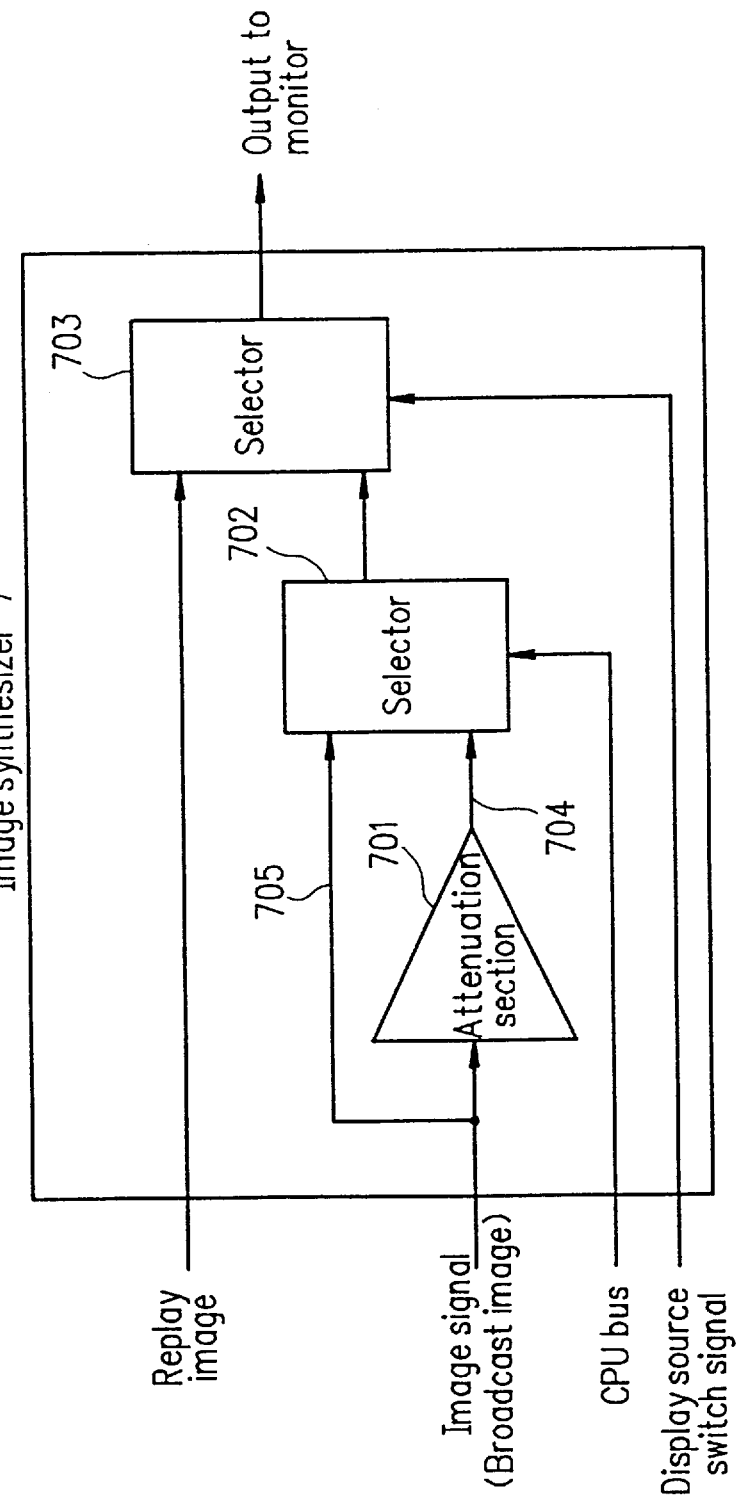
FIG. 9 is a block diagram of an image synthesizer in Example 3.

FIG. 9 shows a configuration of the image synthesizer 7 in Example 3. An attenuation section 701 attenuates the amplitude of a broadcast image signal 705. A selector 702 conducts switching between an attenuated signal 704 output from the attenuation section 701 and the broadcast image signal 705 under the control of the main controller 1. Normally, when a replay image is not being displayed, the broadcast image signal 705 is selected. When a replay image is displayed, the main controller 1 selects the attenuated signal 704 output from the attenuation section 701. The selected signal output from the selector 702 is synthesized with the replay image by a selector 703 based on display position information.

With the above operation, the brightness level of the broadcast image can be lowered when the replay image is displayed. Thus, the resultant broadcast image overlapping the replay image can be viewed comfortably.

In Example 3, the analog signals are synthesized by the image synthesizer 7. It is also possible to use digital data for the synthesization. In the latter case, the attenuation section 701 may have a simpler configuration where, for example, the brightness level is halved by one-bit shift-down with digital data.

EXAMPLE 4

In the operation flow of Example 1 (FIG. 2), the storing starts upon completion of one replay operation. Thus, it is not possible for the user to repeat the replay operation. The repetition of the replay operation can be realized by providing separate remote control buttons for replay and storing at the input 5 so that the user can instruct the start of each operation. In this method, however, the storing of compressed data will not be started unless the user instructs the start of storing. This increases the number of operations the user has to conduct.

In Example 4, in order to solve the above problem, there is provided a timer which starts upon completion of a replay operation. According to this example, by using a single remote control button, the replay operation can be repeated, and, after the replay operation, the storing operation is automatically re-started. That is, the storing operation is started when a predetermined time has passed without receiving another replay instruction from the user. This control method will be described in detail.

Figure 10:
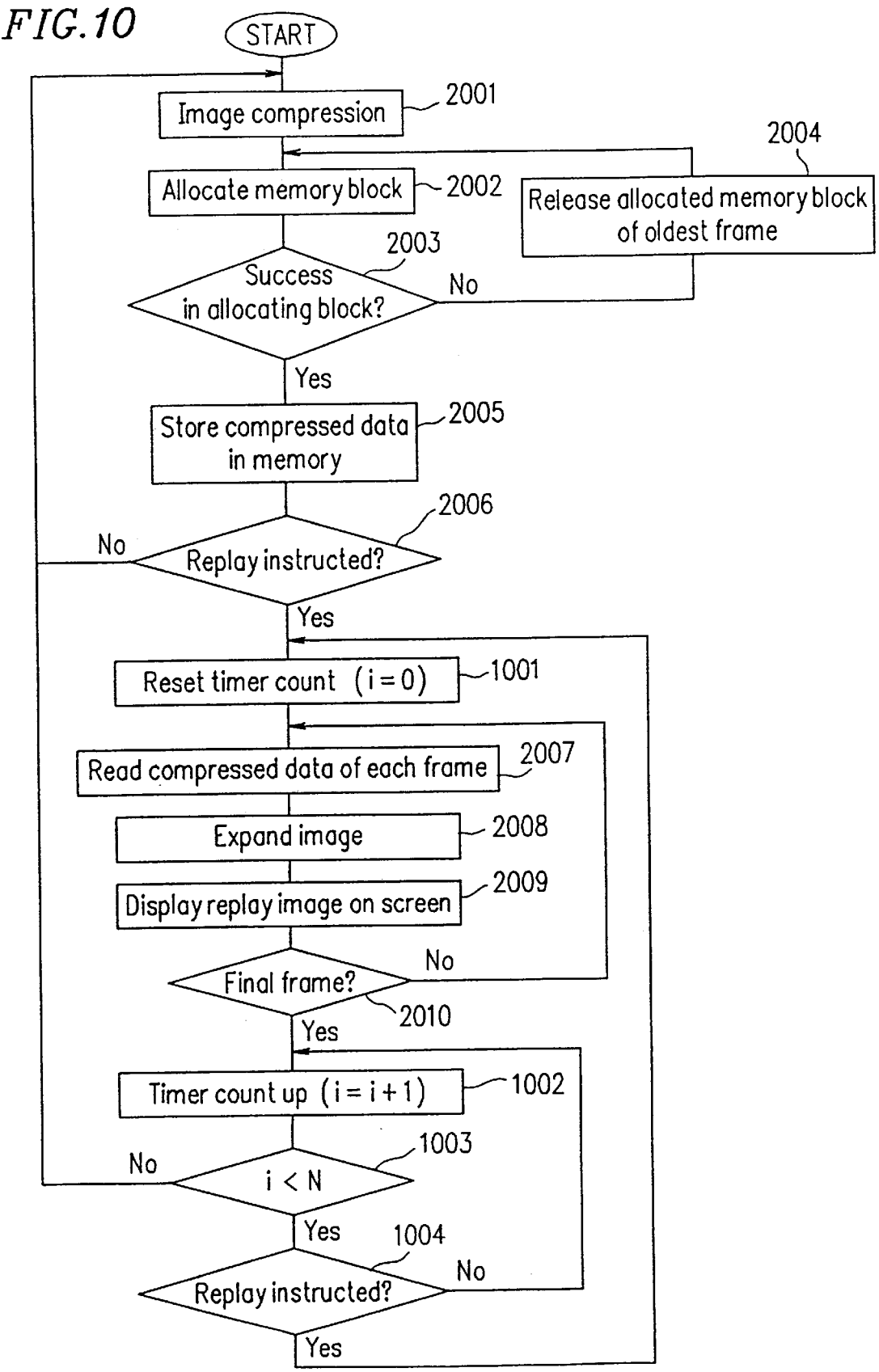
FIG. 10 is a flowchart representing the method of Example 4, where the storing of image data after replay operation is automatically re-started by use of a timer of a main controller.

FIG. 10 is a flowchart showing the control by the main controller 1. The same steps as those in FIG. 2 are denoted by the same reference numerals, and the description thereof is omitted.

The steps from the start until the receipt of replay instruction from the input 5 are the same as those in FIG. 2 (steps 2001 to 2006).

Step 1001: The main controller 1 resets the counter value of an internal timer at zero upon receipt of replay instruction.

Then, steps 2007 to 2010 follow to complete one replay operation.

Step 1002: The counter value is incremented by one.

Step 1003: When the counter value reaches a predetermined value, the process returns to step 2001 to start the storing of compressed data in the buffer memory 3. When the counter value is less than the predetermined value, the process proceeds to the next step.

Step 1004: The main controller 1 checks whether or not the input 5 has received a replay instruction. If received, the process proceeds to step 1001. If not, the process repeats step 1002.

With the above flow control, the replay operation can be conducted upon receipt of replay instruction as long as the counter value does not reach the predetermined value. When the timer count value reaches the predetermined value, the storing operation of compressed data is automatically re-started. This means that for the user, the two operations can be conducted only by use of a single button for replay.

In Example 4, the timer control is conducted by comparing the counter value of the timer with a predetermine value. This can also be realized by using an interval timer which provides interrupts at predetermined intervals. In this method, similar timer control to that described above can be conducted by waiting for either an interrupt from the interval timer or a replay instruction from the user after one replay operation.

EXAMPLE 5

In Example 1, when sub-sampling of image pixels is applied to an image with letters at the image compression, the letters may sometimes become indiscernible due to the sub-sampling. In Example 5, upon receipt of replay instruction from the user, an image is compressed with an altered sampling ratio as described below.

FIG. 11 is a flowchart showing the control by the main controller 1. The same steps as those in FIG. 2 are denoted by the same reference numerals, and the description thereof is omitted.

The steps from the start until the receipt of replay instruction at the input 5 are the same as those in FIG. 2 (steps 2001 to 2006).

Step 1101: When a replay instruction is received at the input 5, the main controller 1 enhances the resolution of image signals of the next frame, compresses the image signals, and stores the compressed signals in the buffer memory 3.

Then, in steps 2007 to 2010, the compressed signals are read from the buffer memory 3 starting from the oldest data in order to effect the replay of the image.

Thus, in Example 5, when an image with small letters is to be replayed, the letters can be made discernible by enhancing the resolution of the image at an instructed timing before storing the image and stopping the replayed image at a final frame to show it as a still picture. Alternatively, the compression ratio may be lowered, instead of enhancing the resolution, upon receipt of a replay instruction, so as to obtain high-quality image display.

EXAMPLE 6

In Examples 1 and 2, the frame sampling is conducted at temporally equal intervals. In Examples 6 and 7, real-time image recording/reproducing methods and apparatus in which an optimal frame sampling is achieved by selecting frames to be sampled in view of the image quality and/or the stored data amount will be described.

In Example 6, while the basic configuration is the same as that shown in FIG. 1, the compression operation by the main controller 1 is different. FIG. 12 is a flowchart of the frame sampling in Example 6, which corresponds to step 2001 in FIG. 2. The sampling operation of this example will be described with reference to FIG. 12.

Step 1201: In the image compression, the main controller 1 resets the counter value for controlling the sampling intervals at zero.

Step 1202: The main controller 1 instructs the compression/expansion processor 4 to produce variable-length coded data. The produced variable-length coded data is held until step 1205 where frames to be sampled are selected.

Step 1203: The main controller 1 calculates an error value per frame caused by the compression. For example, in the case of the fixed rate control as in Example 2, the variable freq may be used as the error value. In other words, the error is judged smaller as the value of freq is closer to 10 since freq 10 means that all the band components have been coded.

Step 1204: The main controller 1 increments the counter value by one. The process proceeds to step 1202 if the value is less than the sampling interval (N=3), or proceeds to the next step if it reaches the sampling interval.

Step 1205: The main controller 1 compares the error values, for example, the values of freq, corresponding to three frames, and selects one frame based on the comparison results. By selecting the frame having the smallest error value, the quality of the resultant replay image can be enhanced.

Thus, in Example 6, a replay image with higher quality can be reproduced by appropriately selecting the frames to be sampled depending on the image.

Besides using the value of freq, the error value may also be calculated by decoding the coded data and calculating the difference between the decoded data and the original data. In this case, a certain processing time is required, but the calculated error value is highly precise.

In Example 6, the sampling interval is "three". The same flow control is also possible by using other sampling intervals. In Example 6, the coded data corresponding to three frames are held until step 1205. In an alternative method, error values may be compared whenever coded data corresponding to two frames are obtained, and the coded data with the smaller error value may be held. This method is advantageous in that a code buffer region corresponding to only two frames is required even when the number of frames to be compared increases.

Figure 13A:
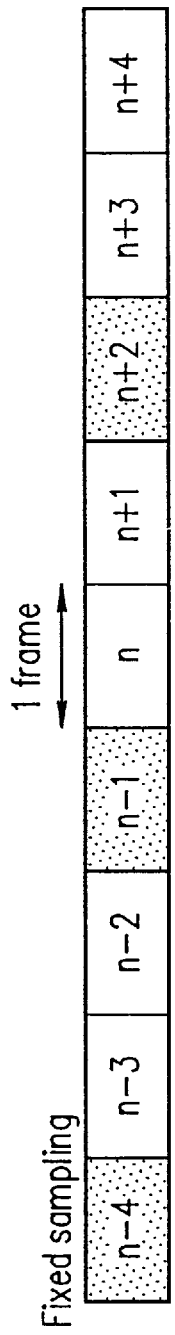
FIGS. 13A and 13B show concepts of the frame sampling in Examples 6 and 7, where the sampling positions are variable.
Figure 13B:
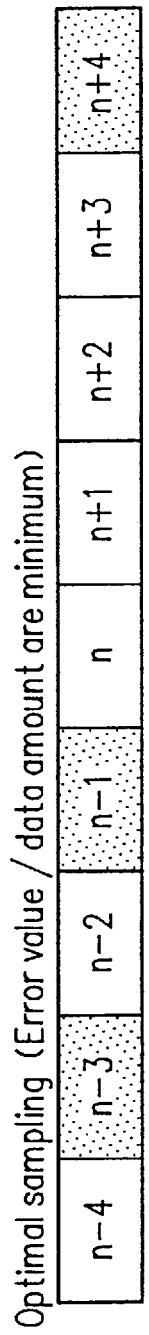

As a result, the sampling interval in Example 6 is not fixed as shown in FIG. 13A (the hatched frames are sampled), but is irregular in a predetermined duration as shown in FIG. 13B. For the expansion of the sampled data, time information on the sampled frames should also be stored, so as to interpolate the sampled frames based on the stored time information at the expansion of the data. The expansion may also be conducted at fixed intervals even when the data is sampled irregularly as shown in FIG. 13B, though in some resultant images the motion is more or less unnatural. In this case, the time information on the sampled frames is not necessary.

EXAMPLE 7

Figure 14:
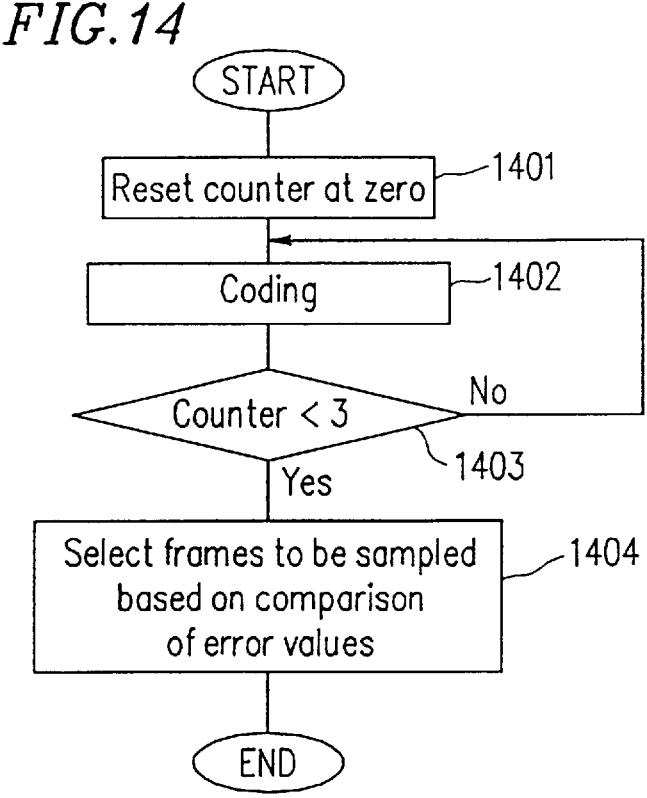
FIG. 14 is a flowchart of the frame selection in Example 7, where frames to be sampled are selected based on the compressed data amount.

FIG. 14 is a flowchart of the compression operation in Example 7, where the frame selection criteria by the main controller 1 is different from that shown in FIG. 12.

Step 1401: In the image compression, the main controller 1 resets the counter value for controlling the sampling intervals at zero.

Step 1402: The main controller 1 instructs the compression/expansion processor 4 to produce variable-length coded data. The produced variable-length coded data is held until step 1404 where frames to be sampled are selected.

Step 1403: The main controller 1 increments the counter value by one. The process proceeds to step 1402 if the value is less than the sampling interval (N=3), or proceeds to the next step if it reaches the sampling interval.

Step 1404: The main controller 1 compares the sizes of variable-length coded data corresponding to three frames, and selects one frame based on the compared results.

In step 1404, the number of frames which can be stored in the buffer memory 4 can be increased by selecting the frame with the smallest data amount. Further, in the case where inter-frame differentials are combined at the compression, the movement of the replay image can be made smooth by selecting the frame with the smallest data amount, because a differential frame with the largest data amount, i.e., with the smallest compression efficiency is a frame with the sharpest movement.

Thus, as described in Examples 6 and 7, by appropriately selecting the frames to be sampled, a replay with a longer reproduction time or a replay with a smoother movement can be realized.

In Example 7, the sampling interval is "three". The same flow control is also possible by using other sampling intervals. Also, in Example 7, the coded data corresponding to three frames are held until step 1404 for the simultaneous comparison of these three frames. In an alternative method, the comparison may be made whenever the coded data corresponding to two frames are obtained, and the coded data with the smaller/larger data amount may be held. This method is advantageous in that a code buffer region corresponding to only two frames is required even when the number of frames to be compared increases.

If the both configurations in Examples 6 and 7 are combined, the user can select either a replay with high quality or a replay with a longer duration.

Examples 1 to 7 can also be implemented on a computer system provided with an image input means under software control. In recent years, a personal computer incorporating a TV tuner has been commercialized. Therefore, the implementation is easy by using such a system. Further, since the performance of a main processor (CPU) of the personal computer has been significantly improved, motion picture compression by software is possible by using the technique of frame sampling.

The software control of the replay operation is similar to those shown in FIGS. 2 and 6. In this case, the main controller 1 corresponds to a CPU of a computer, and the buffer memory 3 corresponds to a memory of the computer (a main memory or a hard disk device).

The timer control and the high-resolution compression operation upon receipt of replay instruction as shown in FIGS. 10 and 11, respectively, can also be realized by software along a similar flow control.

Further, the frame selection as shown in FIGS. 12 and 14 can also be realized by software on a computer by programming the comparison of the compression error values and the data amounts.

In Examples 1 to 7, the processing of the image data is conducted per frame. It can also be conducted in another embodiment per field, or based on same other division of the image signal.

EXAMPLE 8

In Examples 8 and 9, video library systems for managing a library of a video tape will be described. The video library systems adopt the concept of the real-time image recording/reproducing apparatus according to the present invention.

Figure 15:
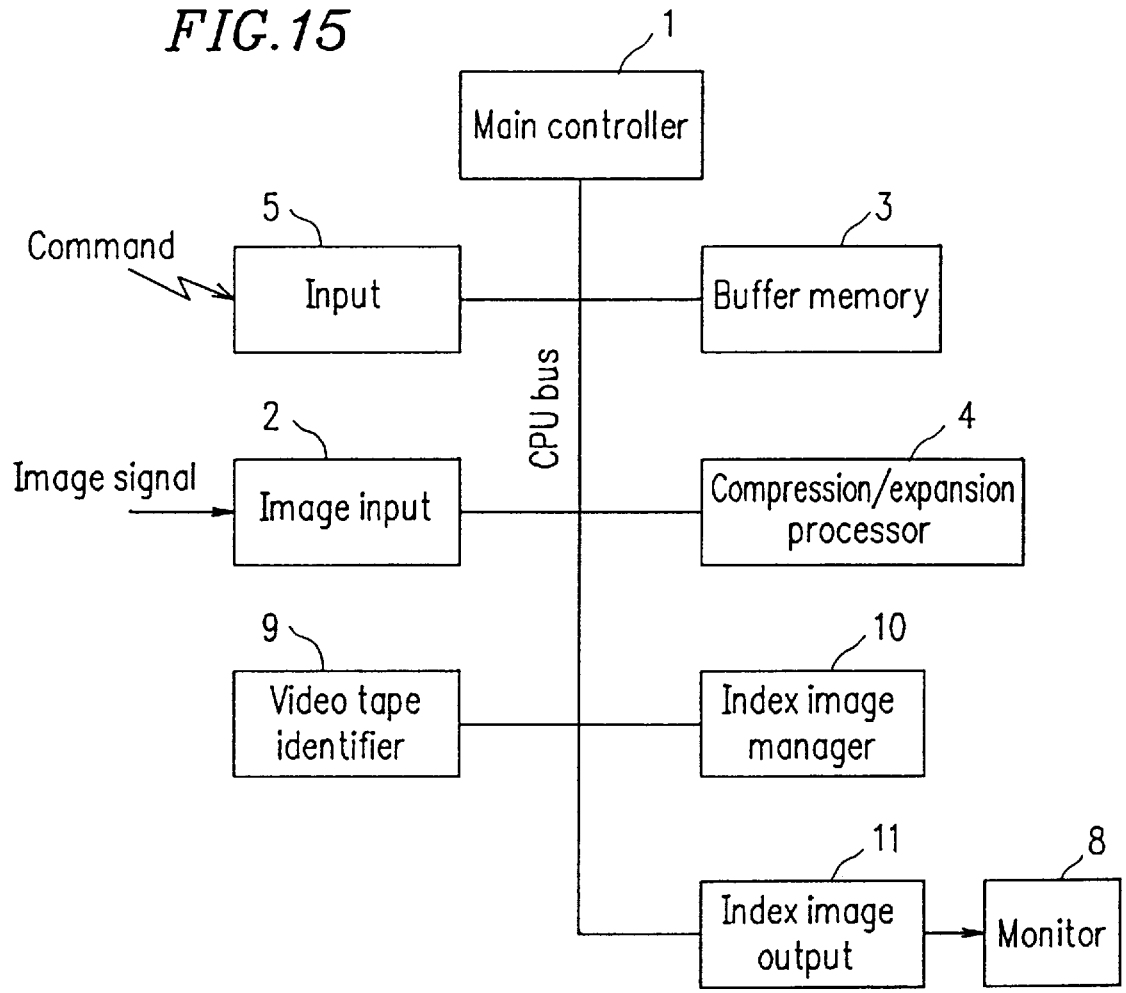
FIG. 15 shows a configuration of the video library system of Example 8.

FIG. 15 is a block diagram showing a configuration of the video library system of Example 8 according to the present invention. Actually, the components shown in FIG. 15 are preferably incorporated in a VTR and the like.

In FIG. 15, components having similar functions to those shown in FIG. 1 are denoted by the same reference numerals, and the description thereof is omitted.

A video tape identifier 9 identifies a video tape inserted in a VTR. For example, the video tape identifier 9 may identify an identification code such as a bar code on a seal attached to the vide tape. An index image manager 10 manages compressed data (still picture) produced by a compression/expansion processor 4 and identification information from the video tape identifier 9 in association with each other. An index image output 11 displays an index image on a monitor and includes, for example, a line buffer for storing display data per line and a circuit for reading the stored display data.

The operation of the video library system of Example 8 will be described with reference to FIGS. 15, 16A, 16B, 17A, and 17B.

Upon start of the recording by the VTR, a main controller 1 starts reading identification information from the video tape identifier 9. An image input 2 receives image signals which are currently being recorded by the VTR.

The main controller 1 determines the interval at which index images are produced based on time information counted from the start of the recording. For example, when the index images are to be produced every 30 minutes, image data is accepted by the compression/expansion processor 4 from the image input 2 every 30 minutes, and the accepted image data is compressed by the compression/ expansion processor 4. The main controller 1 may control the timing at which image data is to be accepted and compressed in the case where the timing is in a commercial break, for example.

The main controller 1 reads the compressed data from the compression/expansion processor 4 and stores the data in the buffer memory 3. When the capacity of the buffer memory 3 becomes full, the main controller 1 halts the storing of the compressed data and conducts processing whereby an alarm is displayed indicating that the capacity is full. Alternatively, when the capacity is full, the system may automatically delete stored index images which are less frequently used so as to store new index image data.

Once an index image is produced, the index image manager 10 manages the compressed data memory position in the buffer memory 3 and the tape identification information as a set. This can be accomplished by forming a table composed of a tape identifier and a compressed data memory position as shown in FIG. 17A.

If the index image is compressed to a size of about 10 KB by the wavelet transformation as described in Example 1, a maximum total of 200 frames can be stored in a 16 M-bit memory. Assuming that index images are produced every 30 minutes, the memory can store index images for about 33 three-hour-recording video tapes. The number of video tapes can be increased by reducing the resolution of the compressed data which is 320×240. Further, by using a hard disk device as the memory, more video tapes can be managed.

Next, the library searching operation will be described.

When a video tape is inserted into a VTR and an user's instruction of library searching is input through the input 5, the main controller 1 reads the identification information of the tape from the video tape identifier 9, and searches for an index image corresponding to the identification information by means of the index image manager 10.

Figure 16B:
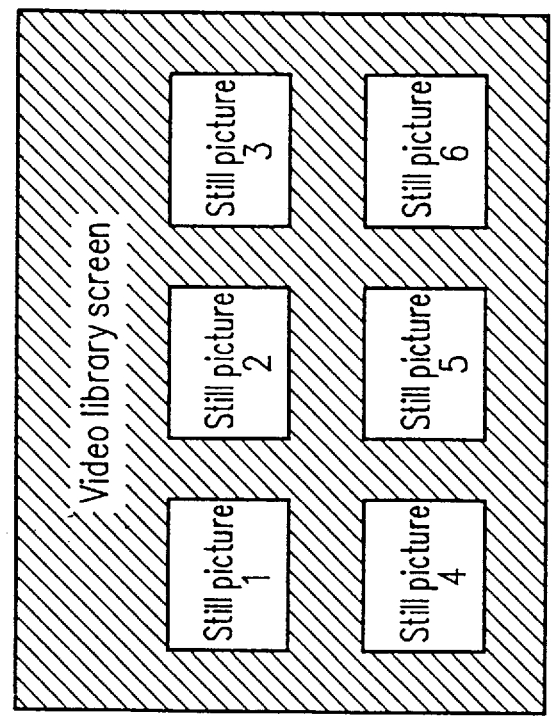
FIGS. 16A and 16B show a method for producing index images and an example of a library retrieval screen, respectively, in Example 8.
Figure 16A:
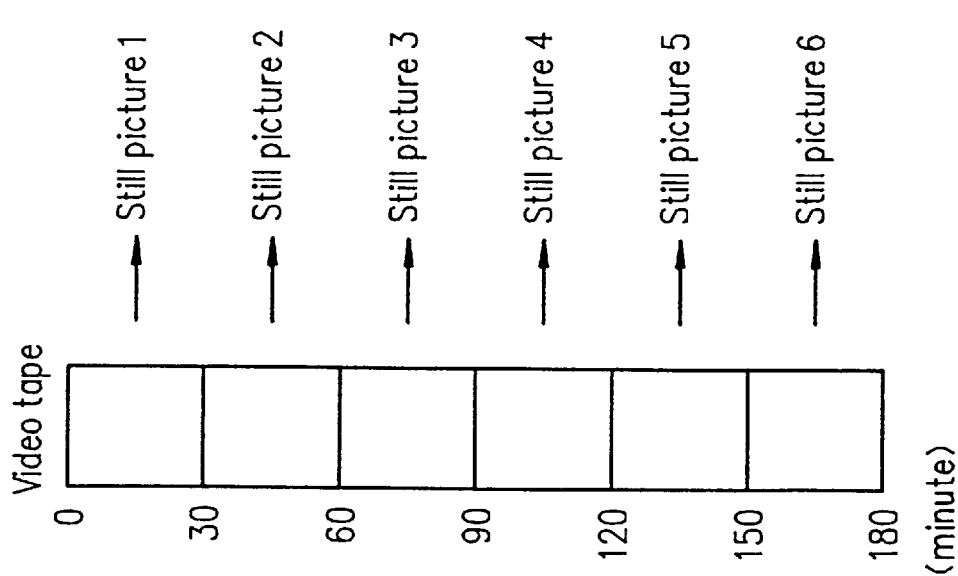

The main controller 1 searches the management table in the index image manager 10, retrieves all elements corresponding to the identification information in question, and reads index image data corresponding to the retrieved elements from the buffer memory 3. The read index image data is expanded by the compression/expansion processor 4, and is displayed by the index image output 11 as a list as shown in FIG. 16B so as to be viewed by the user. This searching is conducted using a random access memory, and thus the speed is significantly high.

In Example 8, index images are produced by compressing image signals at the recording of the image signals, and are stored in the memory by associating the index images with each tape. In this way, the contents of a recorded tape can be displayed as a list instantaneously. The index images are automatically produced by the system. Accordingly, from the viewpoint of the user, the index information of a program is automatically provided by recording the program.

In Example 8, the interval at which index images are to be produced is 30 minutes. Other time intervals may also be used. Alternatively, an image immediately after the start of the recording or an image at a predetermined time (for example, five minutes) after the start of the recording may be used as the index image. In this case, the number of index images per video tape is equal to the number of recordings conducted for the video tape.

EXAMPLE 9

In Example 9, a means for detecting the position information in the tape is provided for the system shown in Example 8. FIG. 18 is a block diagram showing a configuration of the video library system of Example 9.

As shown in FIG. 18, the system includes a tape position information manager 12 which determines the absolute position of data on a tape from the heading of the tape. As the simplest method for identifying the absolute position, a tape may be wound back to the heading at the insertion of the tape into a VTR and then, resetting a tape counter at zero, the tape may be sent forward up to the original position, so as to use the value of the tape counter at the position as the absolute position. Further, in recent years, a VTR which can record absolute position information on a video tape has been commercialized. Using such a VTR, the position from the heading of a tape can be determined upon insertion of the tape into the VTR.

In Example 9, as shown in FIG. 17B, the index image manager 10 manages the tape position information obtained at the production of the index image, together with the tape identifier and the compressed data memory position information. Thus, high-speed searching for the recording position of a certain index image, together with the index searching, can be conducted.

In practice, once the user selects an index image among the list of index images on a screen, the main controller 1 reads the tape position information corresponding to the selected index image from the management table stored in the index image manager 10. The tape is then wound to reach the position by the fast-forward winding or rewinding operation.

Index images may also be produced at intervals measured from the heading of a tape, not from the start of recording. In this case, when images are overwritten on a tape, an index image can easily be stored overwriting the old one.

In Example 9, the library searching is conducted upon receipt of a user's instruction. The searching can also be conducted automatically upon insertion of a video tape. This saves the labor of the user and simplifies the operation. Further, all of the index images stored in the memory and corresponding tape identification information may be displayed as a list, so that the user can recognize instantaneously which tape includes which program.

Thus, in Example 9, in addition to the searching function using the index images, the tape can be wound to reach the very position where the selected image has been recorded.

In Examples 8 and 9, the index image data and the corresponding management information are stored in a memory in the system. It is also possible to store the index image data and the management information for each tape in a memory of the tape if the tape is provided with a random-accessible memory means. In this case, the tape identification information in the management table shown in FIG. 17A and 17B is unnecessary. The exceptional processing by the main controller 1 to be conducted when the buffer memory becomes full is also unnecessary.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A real-time image recording/reproducing apparatus comprising:

image input means for receiving an image signal;

compression means for compressing the image signal so as to produce compressed data;

storing means for storing the compressed data;

control means for judging whether or not a sufficient empty space required for storing the compressed data exists in the storing means, and storing the compressed data in the storing means if a sufficient empty space exists, or allocating a required empty space by releasing oldest data among the compressed data stored in the storing means and storing the compressed data in the allocated empty space if a sufficient empty space does not exist;

instruction input means for receiving a replay instruction;

expansion means for expanding the compressed data stored in the storing means in response to the replay instruction input from the instruction input means so as to produce image data; and output means for outputting the image data.

2. A real-time image recording/reproducing apparatus comprising:

image input means for receiving an image signal;

compression means for compressing the image signal so as to produce compressed data;

storing means for storing the compressed data, including a plurality of blocks having the same size connected with each other in a ring manner;

control means for judging whether or not a sufficient number of empty blocks required for storing the compressed data exist in the storing means, and storing the compressed data in the storing means if a sufficient number of empty blocks exist, or allocating a required number of empty blocks by releasing oldest data among the compressed data stored in the storing means and storing the compressed data in the allocated empty blocks if a sufficient number of empty blocks does not exist;

instruction input means for receiving a replay instruction;

expansion means for expanding the compressed data stored in the storing means in response to the replay instruction input from the instruction input means so as to produce image data; and output means for outputting the image data.

3. An apparatus according to claim 2, wherein the compression means transforms the image signal into a plurality of coefficient data representing different frequency bands, quantizing each of the frequency bands, and variable-length coding the quantized coefficient data, and the compression means further comprises rate control means for deleting the variable-length coded data in the order of higher frequency components to lower frequency components so as to limit the amount of the compressed data to be equal to or less than a predetermined value.

4. An apparatus according to claim 2, further comprising image synthesization means for synthesizing the image data output from the output means and the image signals input from the image input means, to be displayed together, wherein the brightness level of the image signals is lower than the brightness level of the image data.

5. An apparatus according to claim 2, wherein the control means halts the storing of the compressed data in the storing means in response to the replay instruction, and re-starts the storing of the compressed data in the storing means automatically in the case where the duration from the input of the replay instruction until the input of next replay instruction exceeds a predetermined time.

6. An apparatus according to claim 2, wherein the compression means compresses at least one field or frame of image data so as to have higher image quality in response to the replay instruction.

7. An apparatus according to claim 2, wherein the compression means calculates a compression error value for each field or frame, selects one compressed data at a predetermined field or frame interval based on the compression error value.

8. An apparatus according to claim 2, wherein the compression means calculates a size of data after compression for each field or frame, selects one compressed data at a predetermined field or frame interval based on the size of data after compression.

9. A real-time image recording/reproducing method for an apparatus including storing means for storing data, the method comprising the steps of:

a) inputting a image signal;

b) compressing the image signal so as to produce compressed data;

c) judging whether or not a sufficient empty space required for storing the compressed data exists in the storing means, and storing the compressed data in the storing means if a sufficient empty space exists, or allocating a required empty space by releasing oldest data among the compressed data stored in the storing means and storing the compressed data in the allocated empty space if a sufficient empty space does not exist;

d) inputting replay instruction;

e) expanding the compressed data stored in the storing means in response to the replay instruction so as to produce image data; and f) outputting the image data.

10. A real-time image recording/reproducing method for an apparatus including storing means for storing data, the storing means including a plurality of blocks having the same size connected with each other in a ring manner, the method comprising the steps of:

a) inputting a image signal;

b) compressing the image signal so as to produce compressed data;

c) judging whether or not a sufficient number of empty blocks required for storing the compressed data exist in the storing means, and storing the compressed data in the storing means if a sufficient number of empty blocks exist, or allocating a required number of empty blocks by releasing oldest data among the compressed data stored in the storing means and storing the compressed data in the allocated empty blocks if a sufficient number of empty blocks does not exist;

d) inputting replay instruction;

e) expanding the compressed data stored in the storing means in response to the replay instruction so as to produce image data; and f) outputting the image data.

11. A method according to claim 10, wherein the step b) comprises the steps of: transforming the image signal into a plurality of coefficient data representing different frequency bands; quantizing each of the frequency bands; variable-length coding the quantized coefficient data; and deleting the variable-length coded data in the order of higher frequency components to lower frequency components so as to limit the amount of the compressed data to be equal to or less than a predetermined value.

12. A method according to claim 10, further comprising the step of synthesizing the image data and the image signal to be displayed together, wherein the brightness level of the image signal is lower than the brightness level of the image data.

13. A method according to claim 10, wherein the step c) comprises the steps of: halting the storing of the compressed data in the storing means in response to the replay instruction, and re-starting the storing of the compressed data in the storing means automatically in the case where the duration from the input of the replay instruction until the input of next replay instruction exceeds a predetermined time.

14. A method according to claim 10, wherein in the step b) at least one field or frame of image data is compressed so as to have higher image quality in response to the replay instruction.

15. A method according to claim 10, wherein the step b) comprises the steps of: calculating a compression error value for each field or frame; selecting one compressed data at a predetermined field or frame interval based on the compression error value.

16. A method according to claim 10, wherein the step b) comprises the steps of: calculating a size of data after compression for each field or frame; selecting one compressed data at a predetermined field or frame interval based on the size of data after compression.

* * * * *